(12) United States Patent
Kawano et al.

(10) Patent No.: US 11,664,543 B2
(45) Date of Patent: May 30, 2023

(54) POWER SUPPLY DEVICE AND SYSTEM COMPRISING POWER SUPPLY DEVICE AND ELECTRIC TOOL

(71) Applicant: Koki Holdings Co., Ltd., Tokyo (JP)

(72) Inventors: Yoshikazu Kawano, Ibaraki (JP); Satoshi Yamaguchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 150 days.

(21) Appl. No.: 16/959,155

(22) PCT Filed: Jan. 25, 2019

(86) PCT No.: PCT/JP2019/002482
§ 371 (c)(1),
(2) Date: Jun. 30, 2020

(87) PCT Pub. No.: WO2019/171808
PCT Pub. Date: Sep. 12, 2019

(65) Prior Publication Data
US 2020/0343605 A1    Oct. 29, 2020

(30) Foreign Application Priority Data

Mar. 9, 2018    (JP) .............................. JP2018-042600

(51) Int. Cl.
*H01M 10/6235*    (2014.01)
*H02J 7/00*    (2006.01)
(Continued)

(52) U.S. Cl.
CPC ....... *H01M 10/6235* (2015.04); *H01M 50/20* (2021.01); *H01M 50/256* (2021.01);
(Continued)

(58) Field of Classification Search
CPC ........... H01M 10/6235; H01M 50/256; H01M 50/20; H01M 2220/30; H02J 7/00308; H02H 3/087
(Continued)

(56) References Cited

U.S. PATENT DOCUMENTS

| | | | | |
|---|---|---|---|---|
| 2011/0197389 A1* | 8/2011 | Ota | ........................... | B25F 5/00 |
| | | | | 429/121 |
| 2013/0062955 A1* | 3/2013 | Suzuki | .................. | H02J 7/0026 |
| | | | | 307/77 |
| 2013/0098646 A1* | 4/2013 | Funabashi | ............. | H02J 7/0031 |
| | | | | 429/61 |

FOREIGN PATENT DOCUMENTS

| | | |
|---|---|---|
| CN | 103004051 | 3/2013 |
| CN | 106566112 | 6/2016 |

(Continued)

OTHER PUBLICATIONS

"Office Action of China Counterpart Application", dated Mar. 10, 2023, with English translation thereof, p. 1-p. 14.

*Primary Examiner* — Yemane Mehari
(74) *Attorney, Agent, or Firm* — JCIPRNET (57) ABSTRACT

Provided is a power supply device in which the reliability of a voltage output is improved, and also provided is a system comprising the power supply device and an electric tool. The power supply device (1) is provided with: a secondary battery cell (2a); an output unit connected to an electric tool and supplying the power of the secondary battery cell (2a) to the electric tool; and switching elements (Q1), (Q2) capable of interrupting a current path from the secondary battery cell (2a) to the electric tool. The switching element (Q1) switches whether or not to interrupt the current path not by being controlled by a control circuit (12) but in accor-
(Continued)

1 power supply device dance with whether the electric tool connected to the output unit has a shorting bar (59) or not.

12 Claims, 8 Drawing Sheets

(51) Int. Cl.
    *H02H 3/087*     (2006.01)
    *H01M 50/20*     (2021.01)
    *H01M 50/256*     (2021.01)

(52) U.S. Cl.
    CPC ......... *H02H 3/087* (2013.01); *H02J 7/00308* (2020.01); *H01M 2220/30* (2013.01)

(58) Field of Classification Search
    USPC .......................................................... 429/7
    See application file for complete search history.

(56) References Cited

FOREIGN PATENT DOCUMENTS

| | | |
|---|---|---|
| JP | H08153544 | 6/1996 |
| JP | 2005354889 | 12/2005 |
| JP | 2007536098 | 12/2007 |
| JP | 2011067004 | 3/2011 |
| JP | 2014023271 | 2/2014 |
| JP | 2014128856 | 7/2014 |

\* cited by examiner

POWER SUPPLY DEVICE AND SYSTEM COMPRISING POWER SUPPLY DEVICE AND ELECTRIC TOOL

CROSS-REFERENCE TO RELATED APPLICATION

This application is a 371 application of the International PCT application serial no. PCT/JP2019/002482, filed on Jan. 25, 2019, which claims the priority benefits of Japan Patent Application No. 2018-042600, filed on Mar. 9, 2018. The entirety of each of the above-mentioned patent applications is hereby incorporated by reference herein and made a part of this specification.

BACKGROUND OF THE INVENTION

Technical Field

The present invention relates to a power supply device supplying power of a secondary battery to an electric tool and a system including the power supply device and the electric tool.

Related Art

In a power supply device connected to an electric tool to supply power, it is necessary to determine the situation of the electric tool to change an output voltage or interrupt power supply using an interruption part. The invention according to patent literature 1 below discloses a voltage conversion adapter which converts a voltage supplied from a large-capacity power supply such as a backpack type power supply to a voltage which can be used for an electric tool and outputs the converted voltage. The voltage conversion adapter includes a rated voltage identification switch detecting a rated voltage on the electric tool side, and controls the output voltage by detecting a state of the rated voltage identification switch with a microcomputer.

LITERATURE OF RELATED ART

Patent Literature

Patent literature 1: Japanese Patent Laid-Open No. 2014-128856

SUMMARY

Problems to be Solved

In the configuration of patent literature 1, because the rated voltage of the electric tool is identified by the microcomputer and the output voltage is controlled, when a microcomputer failure or the like occurs, there is a possibility that an appropriate voltage output corresponding to the rated voltage cannot be performed. Moreover, the appropriate voltage output also includes not outputting a voltage when interruption is required.

The present invention is completed in view of this situation, and an objective thereof is to provide a power supply device with improved reliability of voltage output, and a system including the power supply device and an electric tool.

Means to Solve Problems

An aspect of the present invention is a power supply device. The power supply device includes: a secondary battery; an output unit connected to an electric tool and supplying power of the secondary battery to the electric tool; a first interruption part capable of interrupting a current path connecting the secondary battery and the output unit; and an identification unit for identifying a type of the electric tool connected to the output unit, wherein the first interruption part switches between whether or not to interrupt the current path according to an identification result of the identification unit without depending on control of a control unit.

The identification unit may have a power-supply-side communication terminal whose voltage changes according to the type of the electric tool connected to the output unit, and the first interruption part may switch between whether or not to interrupt the current path according to the voltage of the power-supply-side communication terminal.

The identification unit may have a power supply unit outputting a constant voltage by power supply from the secondary battery, and the power-supply-side communication terminal can supply power by the power supply unit, and the voltage may change according to the type of the electric tool connected to the output unit.

The power-supply-side communication terminal may include a first power-supply-side communication terminal electrically connected to the power supply unit and a second power-supply-side communication terminal electrically connected to the first interruption part, and the first interruption part may switch between whether or not to interrupt the current path according to a voltage of the second power-supply-side communication terminal.

The power supply device may include a second interruption part capable of interrupting a current path connecting the secondary battery and the output unit, and a control unit controlling the second interruption part, wherein the control unit may switch between whether or not to make the second interruption part interrupt the current path according to the identification result of the identification unit.

The first interruption part may include a first switching element, the second interruption part may include a second switching element, and the first and second switching elements may be arranged in series in the current path.

The first switching element may be arranged closer to the output unit side than the second switching element.

The power supply device may include a detection unit for detecting a voltage of the output unit, wherein the control unit may transmit a stop signal to the electric tool connected to the output unit if the voltage detected by the detection unit is equal to or higher than a specified value when the current path is interrupted by the second interruption part.

The output unit can be alternatively connected to battery pack attachment units of a plurality of electric tools having rated input voltages different from each other, and the first interruption part may switch between whether or not to interrupt the current path according to the rated input voltage of the electric tool connected to the output unit without depending on the control of the control unit.

The output unit can be alternatively connected to an electric tool with a first rated voltage and an electric tool with a second rated voltage lower than the first rated voltage, the first interruption part may not interrupt the current path when the rated voltage of the electric tool connected to the output unit is the first rated voltage, and the first interruption part may interrupt the current path when the rated voltage is the second rated voltage.

The first interruption part may be housed in an adapter which is separate from a body housing the secondary battery and has the output unit.

Another aspect of the present invention is a system including a power supply device and an electric tool. The system includes the power supply device and the electric tool, wherein the electric tool includes: an input unit connected to the output unit of the power supply device; a drive source driven by power supplied to the input unit; a first tool side communication terminal connected to the first power-supply-side communication terminal of the power supply device; and a second tool side communication terminal connected to the second power-supply-side communication terminal of the power supply device, wherein the first tool side communication terminal and the second tool side communication terminal are electrically short-circuited to each other.

Moreover, arbitrary combinations of the above configuration components and conversions of the expression of the present invention between methods, systems, and the like are also effective as the aspects of the present invention.

Effect

According to the present invention, the power supply device with improved reliability of voltage output, and the system including the power supply device and the electric tool can be provided.

DESCRIPTION OF THE EMBODIMENTS

Preferred embodiments of the present invention are described below in detail with reference to the drawings. Moreover, the same or equivalent components, members, and the like shown in each drawing are denoted by the same reference signs, and repeated description is omitted as appropriate. In addition, the embodiments are illustrative and do not limit the invention, and all features or combinations of the features described in the embodiments are not necessarily essential to the invention.

Figure 1:
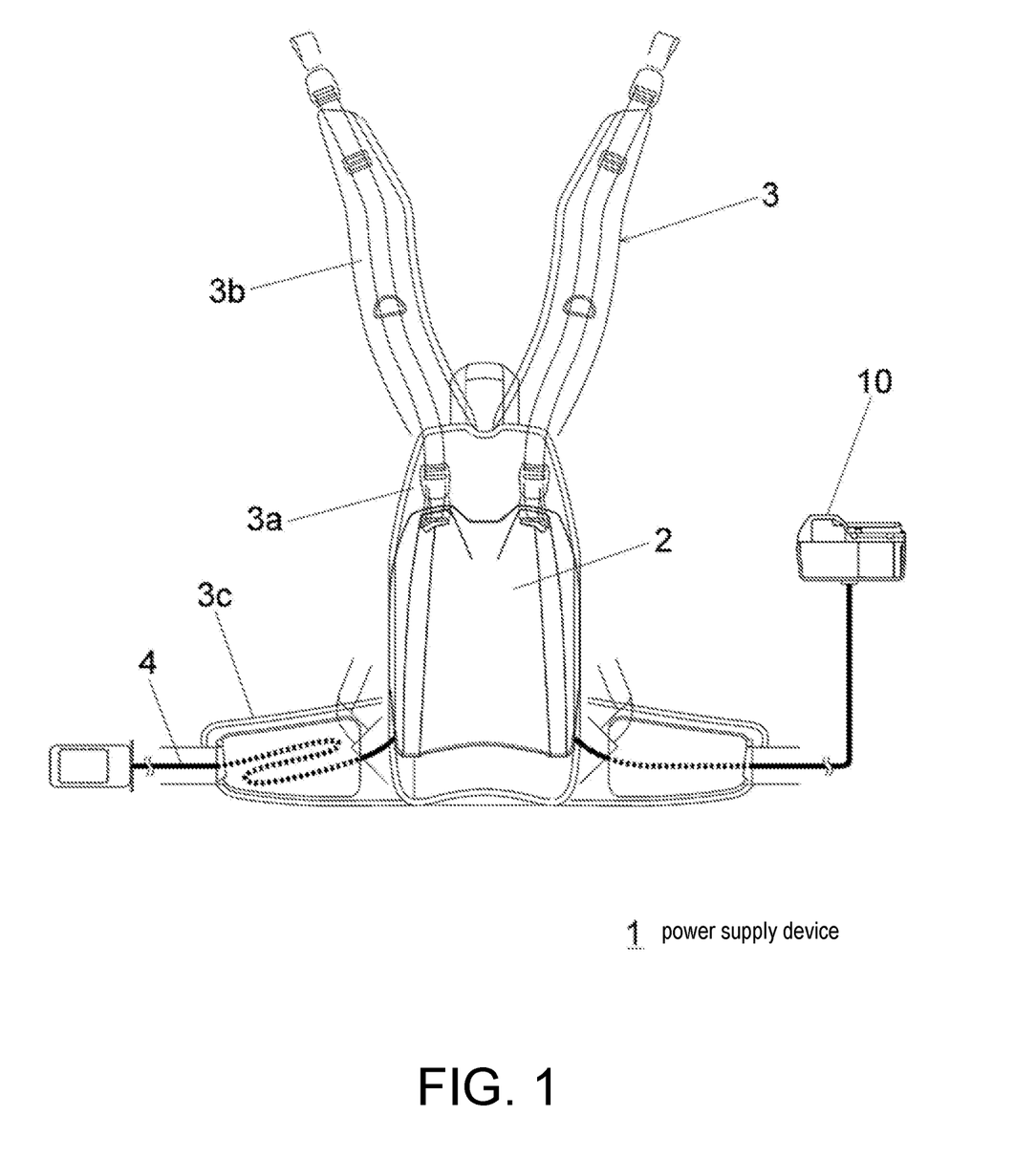
FIG. 1 is a rear external view of a power supply device 1 according to Embodiment 1 of the present invention.

Embodiment 1 As shown in FIG. 1, a power supply device 1 of the embodiment is a backpack type power supply device. The power supply device 1 includes a battery pack unit (case unit) 2 as a body, a backpack unit 3, and an adapter 10. The battery pack unit 2 houses a plurality of secondary battery cells. The backpack unit 3 includes a pad unit 3a, a shoulder belt 3b, and a waist belt 3c. The user can carry the battery pack unit 2 by the backpack unit 3. A cable 4 extends from the battery pack unit 2 along the waist belt 3c. The adapter 10 is arranged at the front end of the cable 4. The adapter 10 has a housing having the same shape as a battery pack for an electric tool and can be detachably attached to the electric tool instead of the battery pack. The adapter 10 can be alternatively connected to battery pack attachment units of a plurality of electric tools having different rated input voltages. The rated input voltage is an example of the type of the electric tool.

Figure 2:
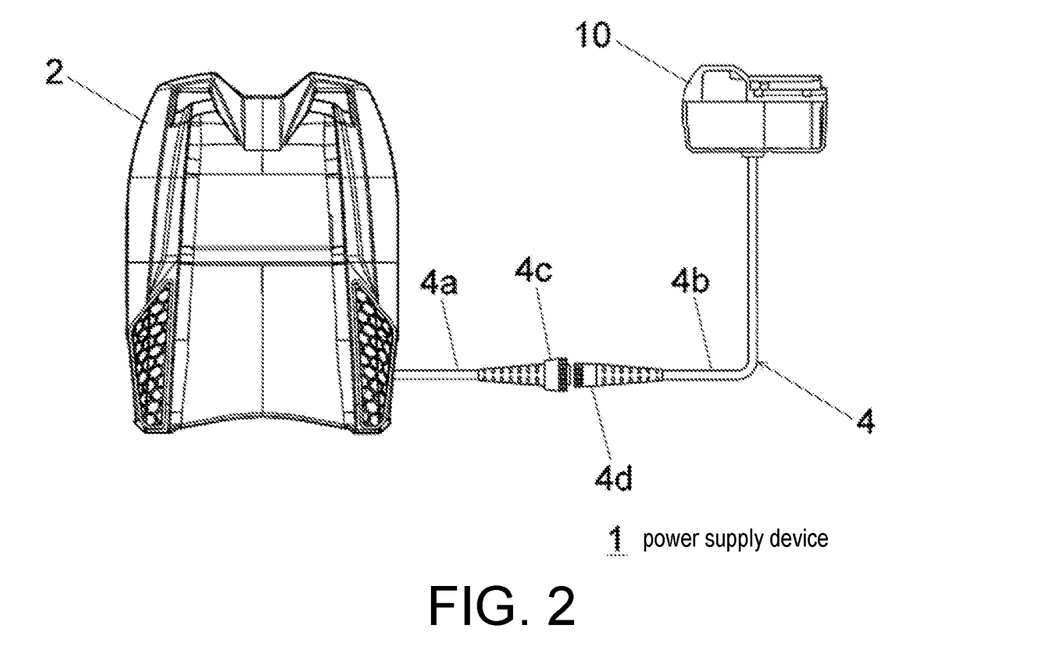
FIG. 2 is a front external view of the power supply device 1 from which a backpack unit 3 is omitted.

In an example of FIG. 2, the cable 4 has a first cable 4a and a second cable 4b. The first cable 4a extends from the battery pack unit 2. An end portion of the first cable 4a on a side opposite to the battery pack unit 2 is a connector 4c. The second cable 4b extends from the adapter 10. An end portion of the second cable 4b on a side opposite to the adapter 10 is a connector 4d. The connector 4d is connected to the connector 4c.

Figure 3:
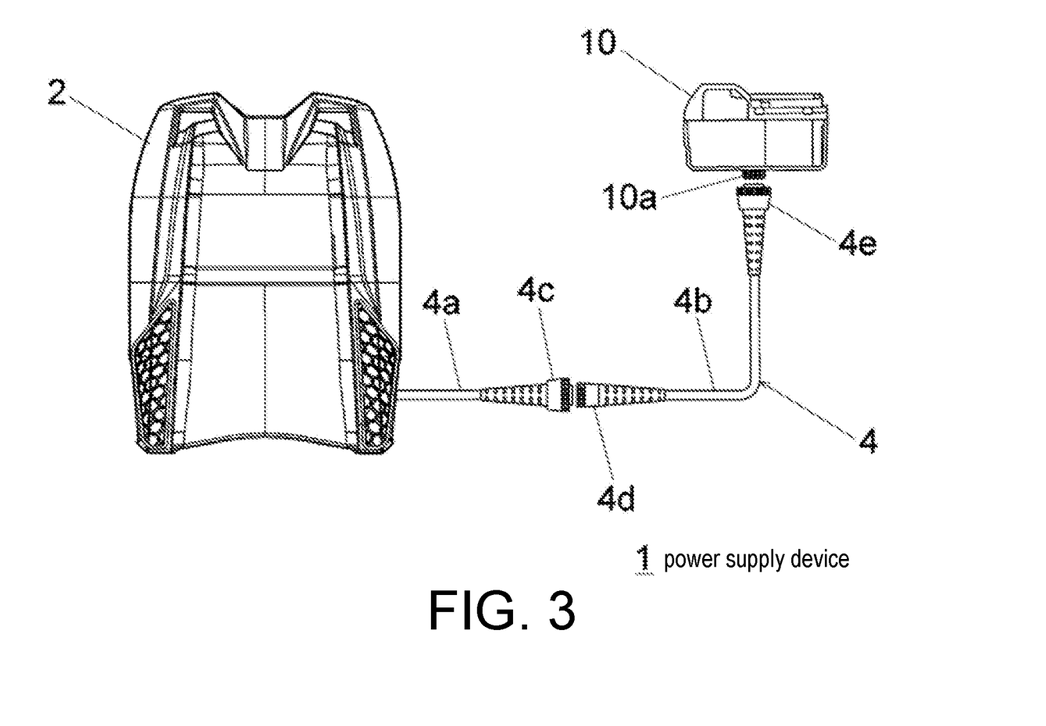
FIG. 3 is a front external view of the power supply device 1 in which a cable 4 is detachable from an adapter 10.

An example of FIG. 3 is different from the example of FIG. 2 in that the second cable 4b is detachable from the adapter 10, and the other points are the same. An end portion of the second cable 4b on the adapter 10 side is a connector 4e. The adapter 10 has a connector unit 10a to which the connector 4e can be connected. Although illustration is omitted, the first cable 4a may be detachable from the battery pack unit 2.

A circuit configuration of the power supply device 1 is described with reference to FIG. 4. The battery pack unit 2 includes a plurality of secondary battery cells 2a and a battery protection IC 2b. The number of series-connected and parallel-connected secondary battery cells 2a is arbitrary. Voltages of the plurality of secondary battery cells 2a are output to a battery-side positive terminal and a battery-side negative terminal. Here, as an example, it is assumed that an output voltage appearing between the battery-side positive terminal and the battery-side negative terminal is 36 V. That is, a rated output voltage of the power supply device 1 is 36 V.

The adapter 10 includes an adapter-input-side positive terminal, an adapter-input-side negative terminal, an adapter-output-side positive terminal T11, an adapter-output-side negative terminal T21, an adapter-side SB11 terminal, an adapter-side SB21 terminal, and an adapter-side LD1 terminal. The adapter-input-side positive terminal is connected to the battery-side positive terminal. The adapter-input-side negative terminal is connected to the battery-side negative terminal. The adapter-output-side positive terminal T11 and the adapter-output-side negative terminal T21 form an output unit of the power supply device 1. The adapter-output-side positive terminal T11 is connected to a positive terminal T12 of an electric tool 51 (a tool-side positive terminal T12) to which the power supply device 1 is connected. The adapter-output-side negative terminal T21 is connected to a negative terminal T22 of the electric tool 51 (a tool-side negative terminal T22). The adapter-side SB11 terminal is connected to a SB12 terminal of the electric tool 51 (a tool-side SB12 terminal). The adapter-side SB21 terminal is connected to a SB22 terminal of the electric tool 51 (a tool-side SB22 terminal). The adapter-side SB11 terminal and the adapter-side SB21 terminal are examples of a power-supply-side communication terminal (an adapter-side communication terminal). The tool-side SB12 terminal and the tool-side SB22 terminal are examples of a tool-side communication terminal. The adapter-side LD1 terminal is connected to an LD2 terminal of the electric tool 51 (a tool-side LD2 terminal).

The adapter 10 includes a regulator (a power supply circuit) 11 serving as a power supply unit, a control circuit 12 serving as a control unit, a voltage detection circuit 13 serving as a detection unit, a switching element Q1 serving as a first interruption part such as a FET (Field Effect Unit), an IGBT (Insulated Gate Bipolar Transistor), or the like, and a switching element Q2 serving as a second interruption part such as a FET, an IGBT, or the like. The regulator 11 converts (reduces) a voltage of the adapter-input-side positive terminal into a constant voltage (here, 5 V for example) for operation of the control circuit 12 and outputs the constant voltage. The control circuit 12 includes a microcomputer (a microcontroller) and the like and operates according to the output voltage of the regulator 11. The control circuit 12 controls on/off of the switching element Q2 by controlling on/off of a switching element Q3. A voltage detection circuit 13 detects the voltage of the adapter-output-side positive terminal T11 and transmits the voltage to the control circuit 12.

Here, the switching elements Q1 and Q2 are P-channel MOS (Metal-Oxide-Semiconductor) FETs. The switching elements Q1 and Q2 are connected in series between the adapter-input-side positive terminal and the adapter-output-side positive terminal T11 (a current path connecting the secondary battery cell 2a and the adapter-output-side positive terminal T11). The switching element Q1 is arranged closer to the adapter-output-side positive terminal T11 than the switching element Q2.

A drain of the switching element Q1 is connected to the adapter-output-side positive terminal T11. A gate serving as a control terminal of the switching element Q1 is connected to the adapter-side SB11 terminal via a resistor R2 and a diode D2. A source of the switching element Q1 is connected to a drain of the switching element Q2. One end of a resistor R1 is connected to the source of the switching element Q1. The other end of the resistor R1 is connected to the gate of the switching element Q1. One end of the resistor R2 is connected to the gate of the switching element Q1 and the other end of the resistor R1. The other end of the resistor R2 is connected to an anode of the diode D2. A cathode of the diode D2 is connected to the adapter-side SB11 terminal.

A source of the switching element Q2 is connected to the adapter-input-side positive terminal. A gate serving as a control terminal of the switching element Q2 is connected to the ground via a resistor R4 and the switching element Q3. One end of a resistor R3 is connected to the source of the switching element Q2. The other end of the resistor R3 is connected to the gate of the switching element Q2. One end of the resistor R4 is connected to the gate of the switching element Q2 and the other end of the resistor R3. Here, the switching element Q3 is a NPN transistor. A collector of the switching element Q3 is connected to the other end of the resistor R4. An emitter of the switching element Q3 is connected to the ground. A base serving as a control terminal of the switching element Q3 is connected to the control circuit 12.

One end of the resistor R5 is connected to a power supply line. The output voltage (5 V) of the regulator 11 is supplied to the power supply line. An anode of a diode D1 is connected to the other end of the resistor R5 and the control circuit 12. A cathode of the diode D1 is connected to the adapter-side SB11 terminal. The adapter-input-side negative terminal and the adapter-output-side negative terminal T21 are connected to each other and to the ground. The adapter-side SB21 terminal and the adapter-output-side negative terminal T21 are short-circuited to each other. The resistor R5, the diodes D1 and D2, the adapter-side SB11 terminal, and the adapter-side SB21 terminal configure an identification unit.

Figure 4:
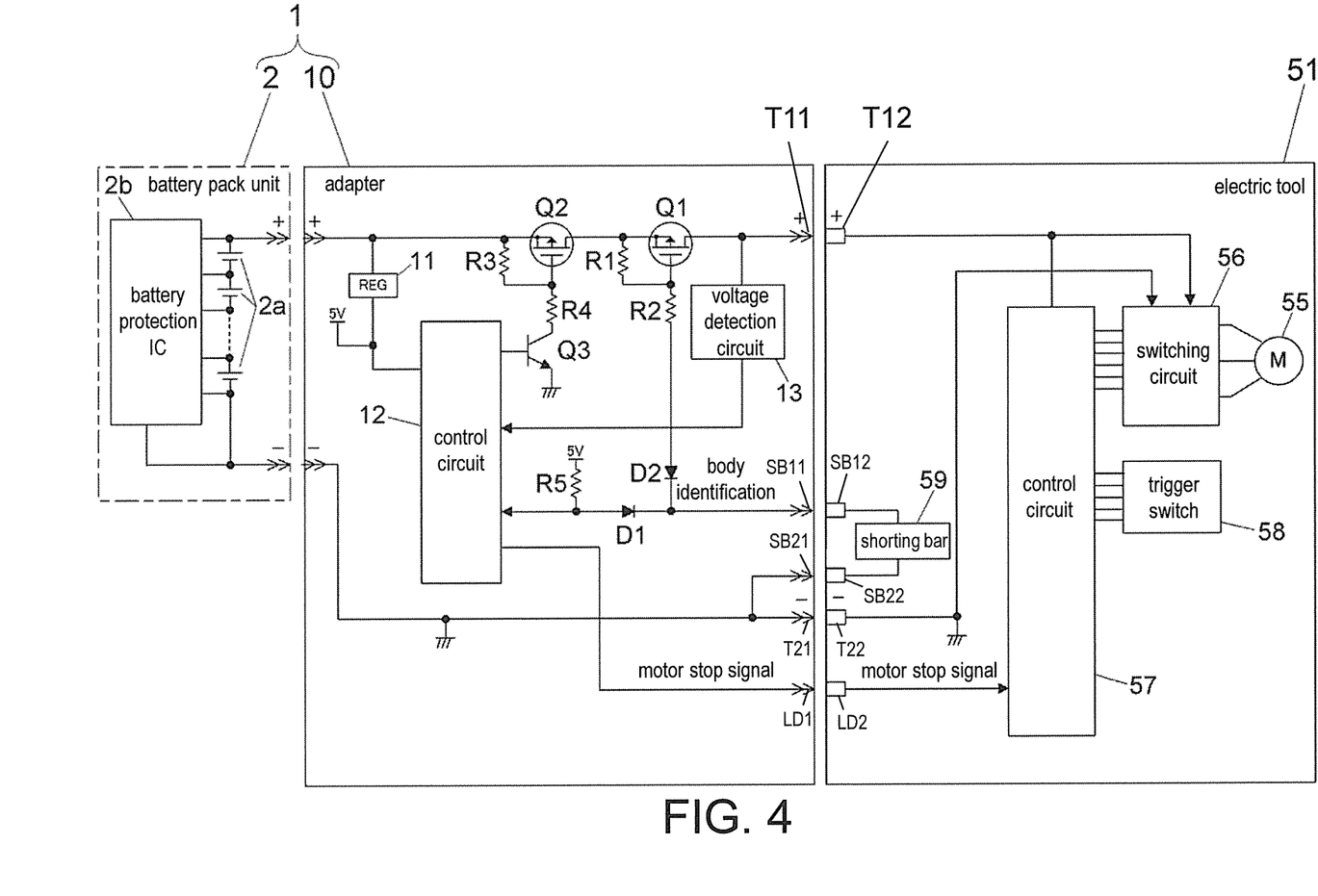
FIG. 4 is a circuit diagram in which the power supply device 1 is connected to an electric tool 51 having a rated input voltage of 36 V.

The electric tool 51 shown in FIG. 4 has a rated input voltage of 36V. A motor 55 is a brushless motor. A switching circuit 56 is, for example, an inverter circuit including switching elements such as a three-phase bridge-connected FET, IGBT or the like. The switching circuit 56 converts, in accordance with control of a control circuit 57, a DC output voltage of the secondary battery cell 2a input from the tool-side positive terminal T12 into an AC voltage for driving the motor 55, and supplies the AC voltage to the motor 55. The control circuit 57 controls (for example, PWM-controls) the switching circuit 56 according to operation of a trigger switch 58. A shorting bar 59 short-circuits between the tool-side SB12 terminal and the tool-side SB22 terminal. The tool-side negative terminal T22 is connected to the ground. The shorting bar 59 is arranged on the electric tool 51 having a rated input voltage of 36 V, but is not arranged on an electric tool 52 (FIG. 5) having a rated input voltage of 18 V. In the embodiment, the rated input voltage of the electric tool connected to the power supply device 1 is identified based on the presence/absence of the shorting bar 59, and presence or absence of the power supply from the power supply device 1 to the electric tool is switched.

When the adapter 10 of the power supply device 1 is connected to the electric tool 51, the adapter-side SB11 terminal is grounded via the shorting bar 59 and is at a ground potential. When it is detected that the adapter-side SB11 terminal has reached the ground potential, the control circuit 12 sets a base voltage of the switching element Q3 to a high level. When the base voltage becomes a high level, a current flows between the base and the emitter of the switching element Q3, and the switching element Q3 is turned on. When the switching element Q3 is turned on, a current flows through a path including the adapter-input-side positive terminal, the resistor R3, the resistor R4, the switching element Q3, and the ground. Due to the voltage drop at the resistor R3, a voltage between the gate and the source of the switching element Q2 becomes negative, and the switching element Q2 is turned on.

When the switching element Q2 is turned on, the current flows through a path including the adapter-input-side positive terminal, the switching element Q2, the resistor R1, the resistor R2, the diode D2, the adapter-side SB11 terminal, the tool-side SB12 terminal (the tool-side communication terminal), the shorting bar 59, the tool-side SB22 terminal, the adapter-side SB21 terminal and the ground. Due to the voltage drop at the resistor R1, the voltage between the gate and the source of the switching element Q1 becomes negative, and the switching element Q1 is turned on. When the switching element Q1 is turned on, the voltage of the secondary battery cell 2a is output to the positive terminal T12 of the electric tool 51 via the battery-side positive terminal, the adapter-input-side positive terminal, the switching element Q2, the switching element Q1, and the adapter-output-side positive terminal T11.

Figure 5:
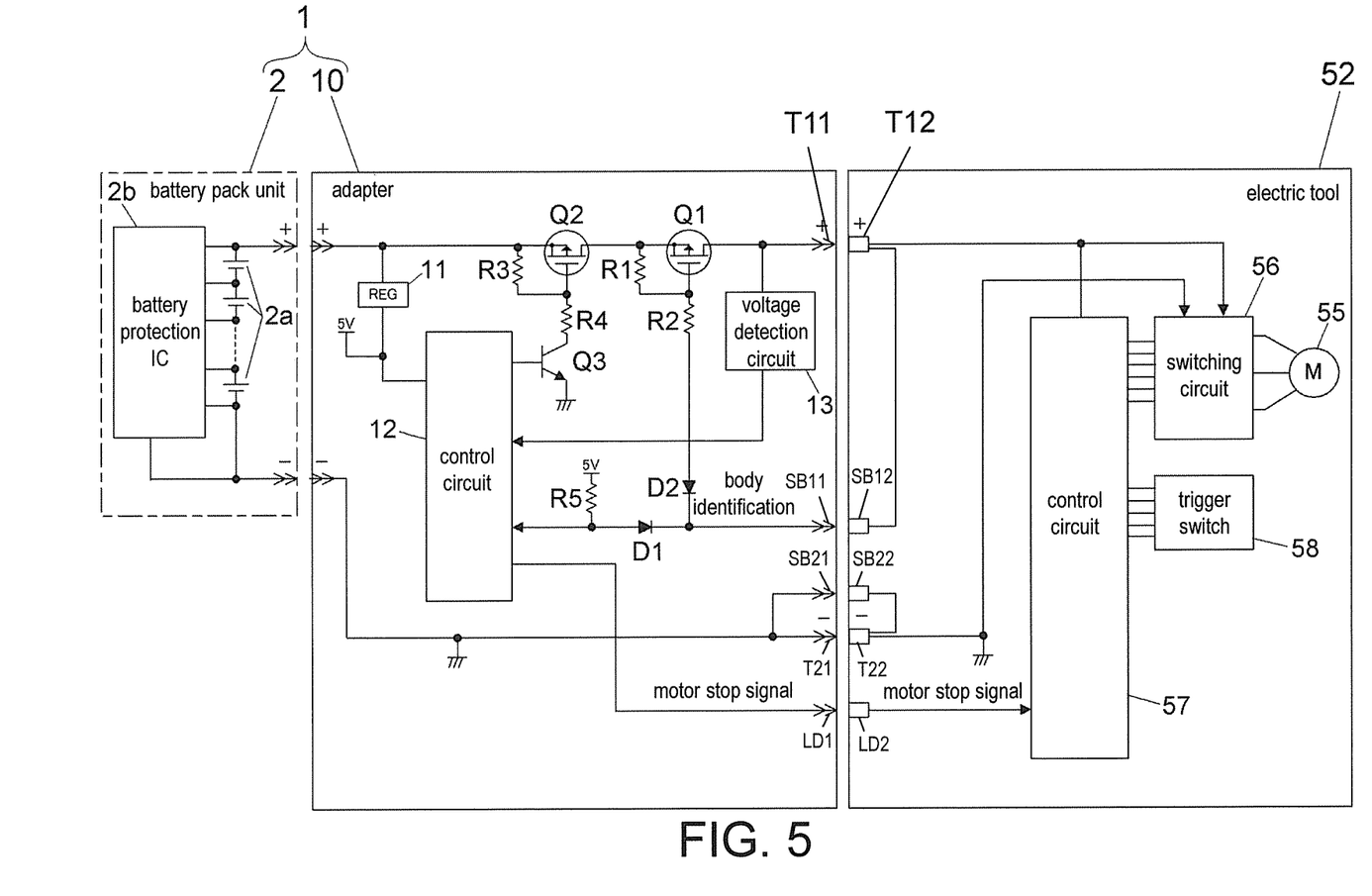
FIG. 5 is a circuit diagram in which the power supply device 1 is connected to an electric tool 52 having a rated input voltage of 18 V.

The electric tool 52 shown in FIG. 5 has a rated input voltage of 18 V and does not have the shorting bar 59 as compared with the electric tool 51 shown in FIG. 4. In the electric tool 52, a tool-side positive terminal T12 and a tool-side SB12 terminal are short-circuited to each other. A tool-side negative terminal T22 and a tool-side SB22 terminal are short-circuited to each other. Moreover, the tool-side positive terminal T12 and the tool-side SB12 terminal may be integrated with each other and may be a large single positive terminal that straddles an adapter-output-side positive terminal T11 and the adapter-side SB11 terminal that are arranged adjacent to each other. Similarly, the tool-side negative terminal T22 and the tool-side SB22 terminal may be integrated with each other and may be a large single negative terminal that straddles an adapter-output-side negative terminal T21 and the adapter-side SB21 terminal that are arranged adjacent to each other. The other points of the electric tool 52 are the same as those of the electric tool 51 shown in FIG. 4.

When the adapter 10 of the power supply device 1 is connected to the electric tool 52, the adapter-side SB11 terminal remains substantially open because the switching elements Q1 and Q2 are turned off. In addition, because there is also a backflow prevention effect of the diodes D1 and D2, no current flows through the resistors R1 and R2. Therefore, the voltage between the gate and the source of the switching element Q1 is zero, and the switching element Q1 is not turned on. That is, the current path from the secondary battery cell 2a to the electric tool 52 is interrupted. Therefore, the voltage of the secondary battery cell 2a is not input to the positive terminal T12 of the electric tool 52. Regarding the fact that the switching element Q1 is not turned on when the electric tool 52 is connected to the power supply device 1, the control of the control circuit 12 does not intervene.

On the other hand, no current flows through the resistor R5 due to the fact that the adapter-side SB11 terminal remains substantially open and the backflow prevention effect of the diodes D1 and D2. Therefore, a voltage at the other end of the resistor R5 (a terminal on a side opposite to the power supply line) is pulled up by the resistor R5 and is maintained at 5 V. When the voltage at the other end of the resistor R5 is 5 V, the control circuit 12 sets the base voltage of the switching element Q3 to a low level. Therefore, no current flows between the base and the emitter of the switching element Q3, and the switching element Q3 is not turned on. When the switching element Q3 is not turned on, no current flows through the resistors R3 and R4, the voltage between the gate and the source of the switching element Q2 is zero, and the switching element Q2 is not turned on. That is, the current path from the secondary battery cell 2a to the electric tool 52 is interrupted. Therefore, the voltage of the secondary battery cell 2a is not input to the positive terminal T12 of the electric tool 52.

If the voltage detected by the voltage detection circuit 13 is equal to or higher than a specified value when the switching element Q3 is turned off to control the switching element Q2 to be off, the control circuit 12 transmits a stop signal to the adapter-side LD1 terminal. For example, when the switching elements Q1 and Q2 fail to turn on, the voltage detected by the voltage detection circuit 13 becomes equal to or higher than the specified value even if the switching element Q2 is controlled to be off. When the stop signal is received via the tool-side LD2 terminal, the control circuit 57 of the electric tool 52 stops the switching control of the switching circuit 56 and stops the motor 55 without depending on the state of the trigger switch 58.

According to the embodiment, the following effects can be obtained.

(1) Without depending on the control of the control circuit 12, the switching element Q1 switches between whether or not to interrupt the current path between the adapter-input-side positive terminal and the adapter-output-side positive terminal T11 according to the rated input voltage of the electric tool connected to the power supply device 1, that is, according to whether the electric tool has the shorting bar 59 or not. Therefore, the power supply device 1 can switch between whether or not to interrupt the current path even when the on/off of the switching element Q2 is not normally switched due to a failure of the control circuit 12, and reliability of the voltage output can be improved.

(2) In accordance with the control of the control circuit 12, the switching element Q2 switches between whether or not to interrupt the current path between the adapter-input-side positive terminal and the adapter-output-side positive terminal T11 according to the rated input voltage of the electric tool connected to the power supply device 1, that is, according to whether the electric tool has the shorting bar 59 or not. By using both the switching elements Q1 and Q2 connected in series in the current path, the power supply device 1 can switch between whether or not to interrupt the current path even if anyone of the switching elements Q1 and Q2 fail to turn on, and the reliability of the voltage output can be improved.

(3) When the power supply device 1 is connected to the electric tool 51 whose rated input voltage is a first rated voltage of 36 V, the current path between the adapter-input-side positive terminal and the adapter-output-side positive terminal T11 is not interrupted (the switching elements Q1 and Q2 are turned on), and when the power supply device 1 is connected to the electric tool 52 whose rated input voltage is a second rated voltage of 18 V, the current path between the adapter-input-side positive terminal and the adapter-output-side positive terminal T11 is interrupted (the switching elements Q1 and Q2 are turned off). Thus, application of a voltage of 36 V output from the secondary battery cell 2a to the electric tool 52 having a rated input voltage of 18 V can be suppressed. Therefore, the control circuit 57 of the electric tool 52 can be suppressed from being damaged, or the motor 55 can be suppressed from being over-rotated.

(4) A current path from the battery-side positive terminal toward the power supply line side through the resistors R1 and R2, the diode D2, and the resistor R5 is interrupted by the diode D1 for backflow prevention. Thus, when the electric tool 52 is connected to the power supply device 1, the current from the source side of the switching element Q1 toward the gate side of the switching element Q1 can be prevented from flowing to the resistor R1, and the switching element Q1 can be reliably maintained off. A current path from the power supply line toward the resistor R2 side through the resistor R5 and the diode D1 is interrupted by the diode D2 for backflow prevention. Thus, when the electric tool 52 is connected to the power supply device 1, the voltage at the other end of the resistor R5 (the end portion on the side opposite to the power supply line) can be reliably set to 5 V (the high level), and the off control of the switching element Q2 achieved by the control circuit 12 can be reliably executed. As described above, the power supply device 1 includes the diodes D1 and D2, and thereby the on/off switching of the switching element Q1 not depending on the control the control circuit 12 and the on/off switching of the switching element Q2 depending on the control the control circuit 12 can be achieved using the common adapter-side SB11 terminal.

(5) The switching element Q2 controlled by the control circuit 12 is arranged closer to the adapter-input-side positive terminal side (a side farther from the electric tool) than the switching element Q1. Because the switching element closer to the electric tool side is more easily broken, the switching element Q2 can be suppressed from being damaged.

(6) If the voltage detected by the voltage detection circuit 13 is equal to or higher than the specified value when the switching element Q2 is controlled to be off, the control circuit 12 transmits the stop signal to the adapter-side LD1 terminal, and thus even when the switching elements Q1 and Q2 fail to turn on, drive of the electric tool connected to the power supply device 1 can be stopped.

(7) The adapter 10 which is separate from the battery pack unit 2 has a configuration related to the interruption of the current path from the secondary battery cell 2a to the electric tool, such as the control circuit 12, the switching elements Q1 and Q2, and the like. Thus, when the configuration is damaged or broken, only the adapter 10 needs to be replaced, and thus replacement cost can be suppressed.

Figure 6:
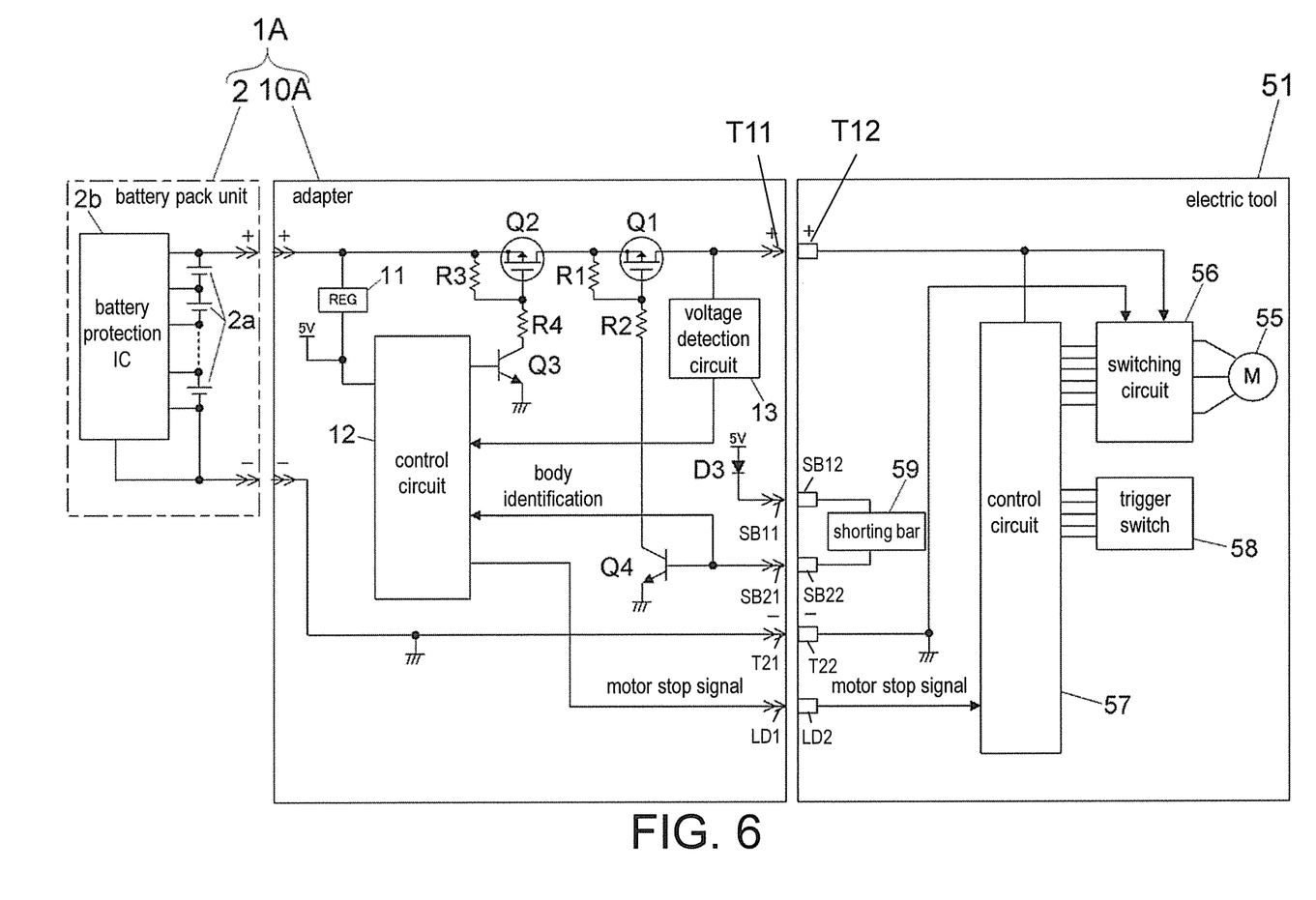
FIG. 6 is a circuit diagram in which a power supply device 1A according to Embodiment 2 of the present invention is connected to the electric tool 51 having a rated input voltage of 36 V.

Embodiment 2 FIG. 6 is a circuit diagram in which a power supply device 1A according to Embodiment 2 of the present invention is connected to the electric tool 51 having a rated input voltage of 36 V. In FIG. 6, configurations of the battery pack unit 2 and the electric tool 51 are the same as the configurations of the battery pack unit 2 and the electric tool 51 in FIG. 4. On the other hand, in FIG. 6, the configuration of an adapter 10A is partially different from the adapter 10 in FIG. 4. The description below focuses on the differences.

The adapter 10A does not include the resistor R5 and the diodes D1 and D2 included in the adapter 10 in FIG. 4. On the other hand, the adapter 10A includes a diode D3 and a switching element Q4 not included in the adapter 10 in FIG. 4. An anode of the diode D3 is connected to a power supply line. A cathode of the diode D3 is connected to the adapter-side SB11 terminal. Here, the switching element Q4 is a NPN transistor. A collector of the switching element Q4 is connected to the other end of the resistor R2. An emitter of the switching element Q4 is connected to the ground. A base serving as a control terminal of the switching element Q4 is connected to the adapter-side SB21 terminal. The adapter-side SB21 terminal is connected to the control circuit 12. The adapter-side SB21 terminal and the adapter-output-side negative terminal T21 are not connected to each other. The switching element Q4, the diode D3, the adapter-side SB11 terminal, and the adapter-side SB21 terminal configure an identification unit.

When the adapter 10A of the power supply device 1A is connected to the electric tool 51, a voltage of the power supply line is input to the control circuit 12 and the base of the switching element Q4 via the diode D3, the adapter-side SB11 terminal, the tool-side SB12 terminal, the shorting bar 59, the tool-side SB22 terminal, and the adapter-side SB21 terminal. If it is detected that a voltage of the adapter-side SB21 terminal reaches a high level (a voltage of the power supply line), the control circuit 12 sets a base voltage of the switching element Q3 to a high level. Then, as in the case of FIG. 4, the switching element Q3 is turned on, and the switching element Q2 is turned on.

On the other hand, because the voltage of the power supply line is input to the base of the switching element Q4, a current flows between the base and the emitter of the switching element Q4, and the switching element Q4 is turned on. Therefore, if the switching element Q2 is turned on as described above, the current flows through a path including the adapter-input-side positive terminal, the switching element Q2, the resistor R1, the resistor R2, the switching element Q4, and the ground. Due to the voltage drop at the resistor R1, the voltage between the gate and the source of the switching element Q1 becomes negative, and the switching element Q1 is turned on. When the switching element Q1 is turned on, the voltage of the secondary battery cell 2a is output to the positive terminal T12 of the electric tool 51 via the battery-side positive terminal, the adapter-input-side positive terminal, the switching element Q2, the switching element Q1, and the adapter-output-side positive terminal T11.

Figure 7:
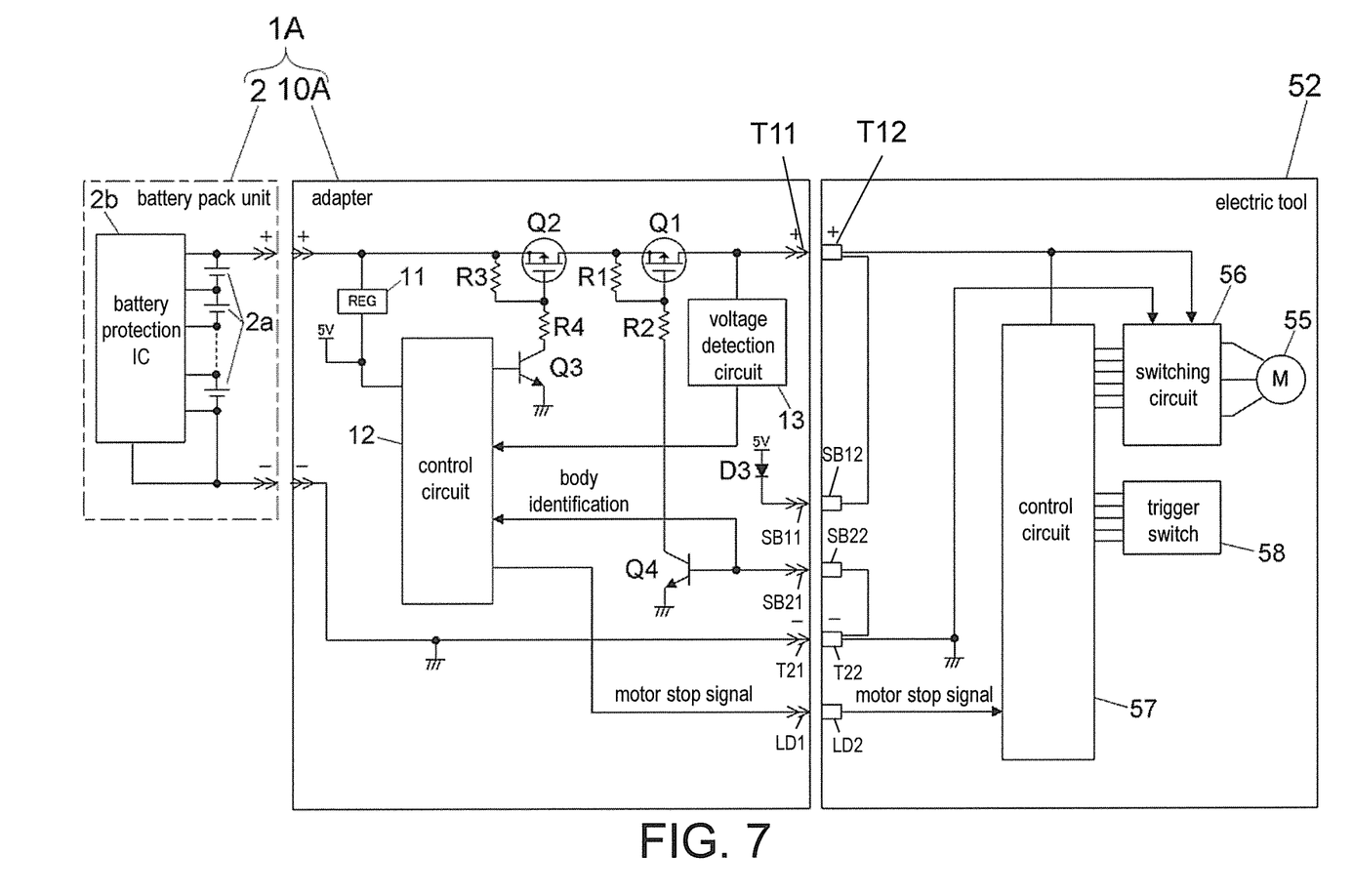
FIG. 7 is a circuit diagram in which the power supply device 1A is connected to the electric tool 52 having a rated input voltage of 18 V.

FIG. 7 is a circuit diagram in which the power supply device 1A is connected to the electric tool 52 having a rated input voltage of 18 V. In FIG. 7, the configuration of the electric tool 52 is the same as the electric tool 52 shown in FIG. 5. When the adapter 10A of the power supply device 1A is connected to the electric tool 52, the adapter-side SB21 terminal is grounded via the tool-side SB22 terminal, the tool-side negative terminal T22, and the adapter-output-side negative terminal T21 and is at a ground potential. Thus, the voltage between the base and the emitter of the switching element Q4 becomes zero, no current flows between the base and the emitter, and thus the switching element Q4 is not turned on. Because the switching element Q4 is off, no current flows through the resistors R1 and R2, the voltage between the gate and the source of the switching element Q1 becomes zero, and the switching element Q1 is not turned on. That is, the current path from the secondary battery cell 2a to the electric tool 52 is interrupted. Therefore, the voltage of the secondary battery cell 2a is not input to the positive terminal T12 of the electric tool 52. Regarding the fact that the switching element Q1 is not turned on when the electric tool 52 is connected to the power supply device 1A, the control of the control circuit 12 does not intervene.

On the other hand, the control circuit 12 sets the base voltage of the switching element Q3 to a low level when the voltage of the adapter-side SB21 terminal is at the ground potential. Thus, no current flows between the base and the emitter of the switching element Q3, and the switching element Q3 is not turned on. When the switching element Q3 is not turned on, no current flows through the resistors R3 and R4, the voltage between the gate and the source of the switching element Q2 is zero, and the switching element Q2 is not turned on. That is, the current path from the secondary battery cell 2a to the electric tool 52 is interrupted. Therefore, the voltage of the secondary battery cell 2a is not input to the positive terminal T12 of the electric tool 52.

The embodiment can also achieve effects similar to the effects (1)-(3) and (5)-(7) of Embodiment 1. In addition, according to the embodiment, by the diode D3 for backflow prevention, the current from the secondary battery cell 2a can be prevented from flowing into the power supply line when the electric tool 52 is connected to the power supply device 1A. In addition, because the voltage of the adapter-side SB21 terminal is used for both the identification of the rated voltage achieved by the control circuit 12 and the on/off switching of the switching element Q1 achieved by the on/off switching of the switching element Q4, the on/off switching of the switching element Q1 not depending on the control of the control circuit 12 and the on/off switching of the switching element Q2 depending on the control of the control circuit 12 can be achieved using the common adapter-side SB21 terminal.

Figure 8:
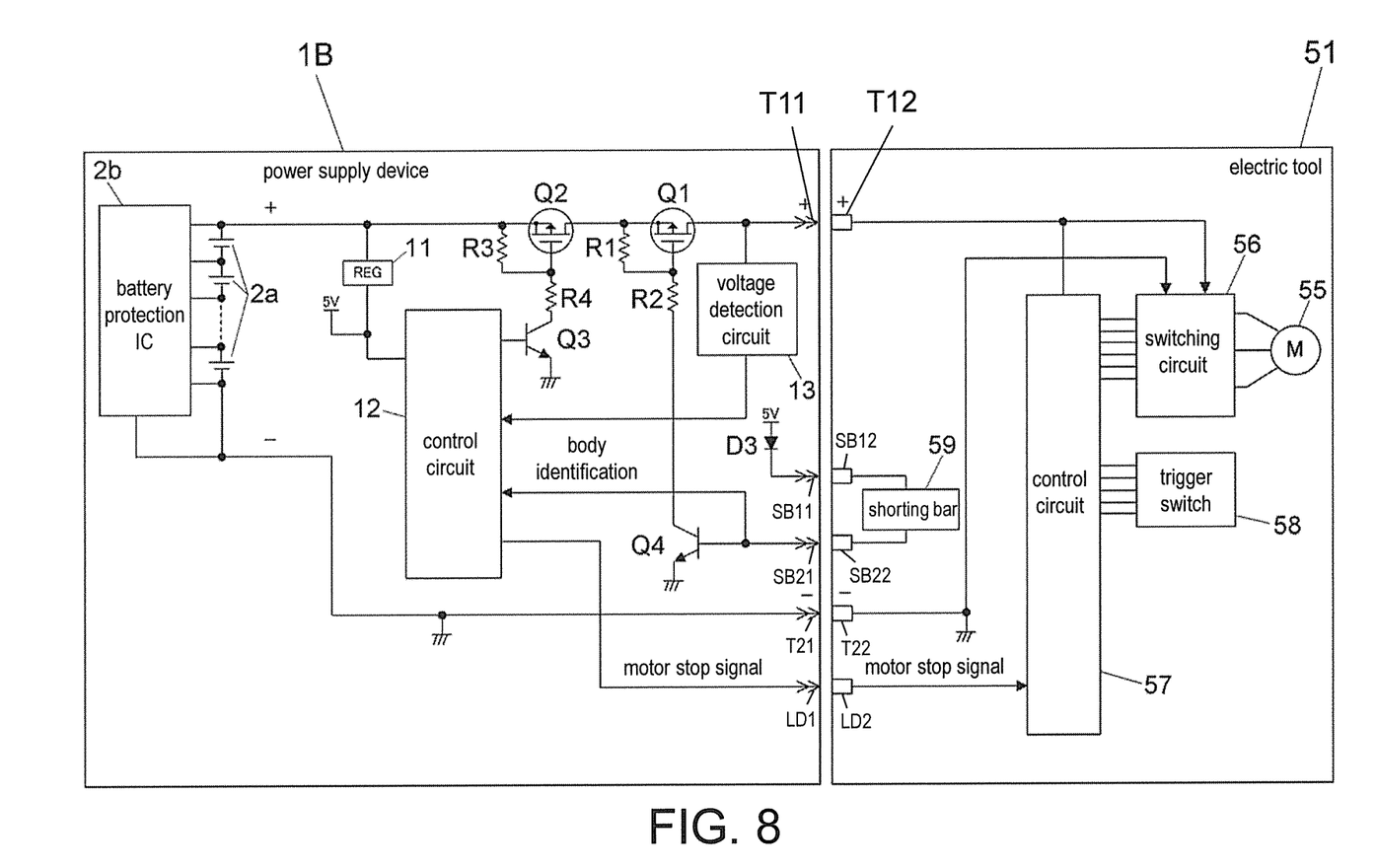
FIG. 8 is a circuit diagram in which a power supply device 1B according to Embodiment 3 of the present invention is connected to the electric tool 51 having a rated input voltage of 36 V.
Figure 9:
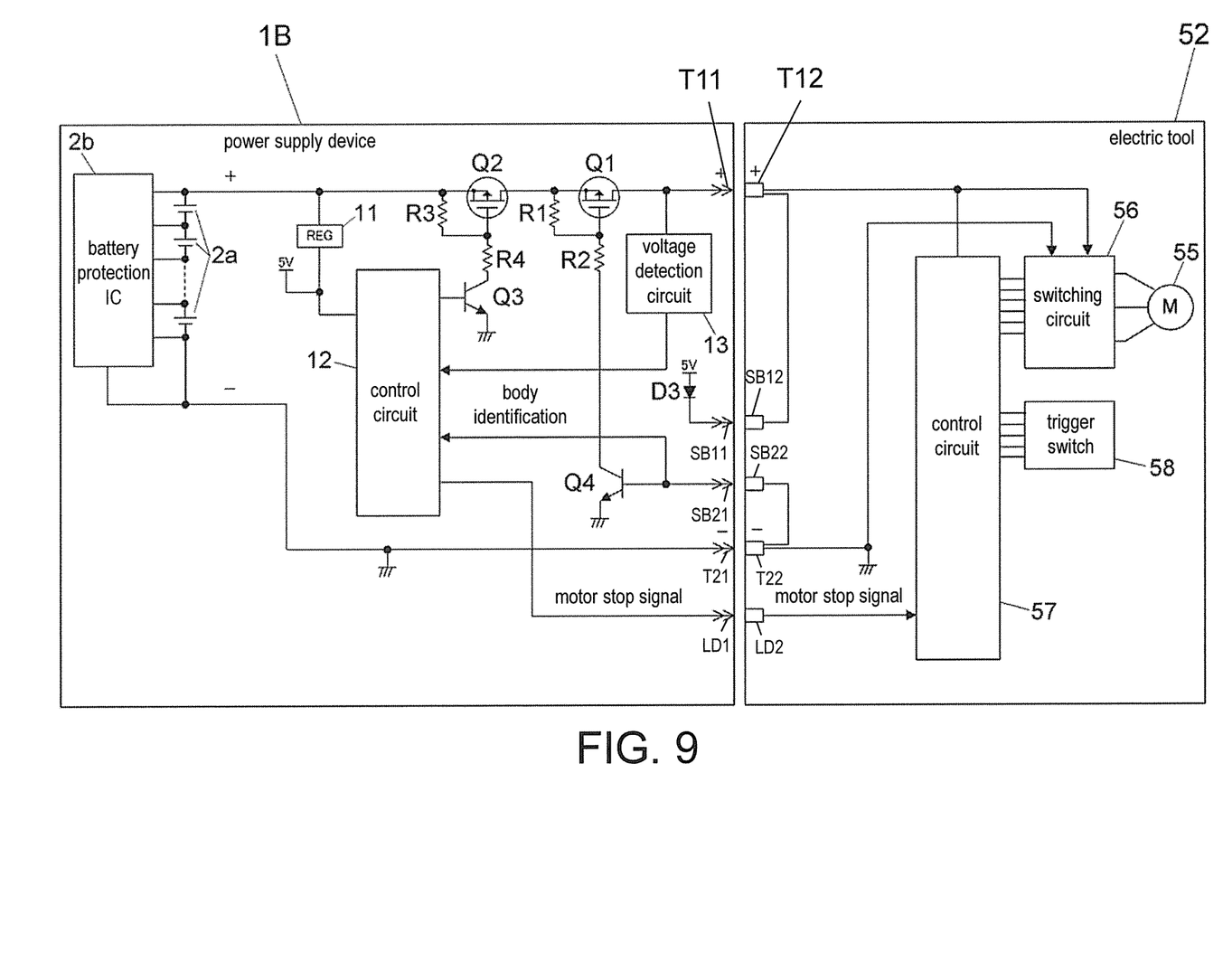
FIG. 9 is a circuit diagram in which the power supply device 1B is connected to the electric tool 52 having a rated input voltage of 18 V.

Embodiment 3 FIG. 8 is a circuit diagram in which a power supply device 1B according to Embodiment 3 of the present invention is connected to the electric tool 51 having a rated input voltage of 36 V. FIG. 9 is a circuit diagram in which the power supply device 1B is connected to the electric tool 52 having a rated input voltage of 18 V. As compared with the power supply device 1A shown in FIG.

6 and FIG. 7, the power supply device 1B is different in that the battery pack unit 2 and the adapter 10A which are separate in the power supply device 1A are integrated as a battery pack, and the other points are the same. According to the embodiment, the same effects as those of Embodiment 2 can be obtained, except for the effects of Embodiment 2 achieved by the separation of the battery pack unit 2 and the adapter 10A.

In the above, the present invention is described taking the embodiments as examples, but it is apparent to those skilled in the art that various modifications can be made to each component or each processing process of the embodiments within the scope of the claims.

What is claimed is:

1. A power supply device, comprising:
   a secondary battery;
   an output terminal connected to an input terminal of an electric tool and supplying power of the secondary battery to the electric tool;
   a control unit controlling power supplied from the output terminal;
   a first interruption part disposed on a current path connecting the secondary battery and the output terminal, and capable of interrupting a current flow on the current path; and
   an identification unit for identifying a type of the electric tool connected to the output terminal,
   wherein the first interruption part switches between whether or not to interrupt the current path according to an identification result of the identification unit without depending on control of the control unit.

2. The power supply device according to claim 1, wherein the identification unit has a power-supply-side communication terminal whose voltage changes according to the type of the electric tool connected to the output terminal, and
   the first interruption part switches between whether or not to interrupt the current path according to the voltage of the power-supply-side communication terminal.

3. The power supply device according to claim 2, wherein the identification unit has a power supply unit outputting a constant voltage by power supply from the secondary battery, and
   the power-supply-side communication terminal is capable of supplying power by the power supply unit, and the voltage changes according to the type of the electric tool connected to the output terminal.

4. The power supply device according to claim 3, wherein the power-supply-side communication terminal comprises a first power-supply-side communication terminal electrically connected to the power supply unit and a second power-supply-side communication terminal electrically connected to the first interruption part, and
   the first interruption part switches between whether or not to interrupt the current path according to a voltage of the second power-supply-side communication terminal.

5. The power supply device according to claim 1, comprising:
   a second interruption part capable of interrupting the current path connecting the secondary battery and the output terminal; and
   a control unit controlling the second interruption part, wherein
   the control unit switches between whether or not to make the second interruption part interrupt the current path according to the identification result of the identification unit.

6. The power supply device according to claim 5, wherein the first interruption part comprises a first switching element,
   the second interruption part comprises a second switching element, and
   the first switching element and the second switching element are arranged in series in the current path.

7. The power supply device according to claim 6, wherein the first switching element is arranged closer to the output terminal side than the second switching element.

8. The power supply device according to claim 5, comprising a detection unit for detecting a voltage of the output terminal, wherein
   the control unit transmits a stop signal to the electric tool connected to the output terminal if the voltage detected by the detection unit is equal to or higher than a specified value when the current path is interrupted by the second interruption part.

9. A power supply device comprising:
   a secondary battery;
   an output unit connected to an electric tool and supplying power of the secondary battery to the electric tool;
   a first interruption part capable of interrupting a current path connecting the secondary battery and the output unit; and
   an identification unit for identifying a type of the electric tool connected to the output unit,
   wherein the output terminal is capable of being alternatively connected to battery pack attachment units of a plurality of electric tools having rated input voltages different from each other, and
   the first interruption part switches between whether or not to interrupt the current path according to the rated input voltage of the electric tool connected to the output terminal without depending on the control of the control unit.

10. The power supply device according to claim 9, wherein the output terminal is capable of being alternatively connected to an electric tool with a first rated voltage and an electric tool with a second rated voltage lower than the first rated voltage, and
    the first interruption part does not interrupt the current path when the rated voltage of the electric tool connected to the output terminal is the first rated voltage, and the first interruption part interrupts the current path when the rated voltage is the second rated voltage.

11. The power supply device according to claim 1, wherein the first interruption part is housed in an adapter which is separate from a body housing the secondary battery and has the output terminal.

12. A system comprising a power supply device and an electric tool, wherein
    the power supply device comprises:
    a secondary battery;
    an output terminal connected to an input terminal of an electric tool and supplying power of the secondary battery to the electric tool;
    a first interruption part disposed on a current path connecting the secondary battery and the output terminal, and capable of interrupting a current flow on the current path; and
    an identification unit for identifying a type of the electric tool connected to the output terminal, and the identification unit has a power-supply-side communication terminal whose voltage changes according to the type of the electric tool connected to the output terminal, and the identification unit has a power supply unit outputting a constant voltage by power supply from the secondary battery, and the power-supply-side communication terminal is capable of supplying power by the power supply unit, and the voltage changes according to the type of the electric tool connected to the output terminal, wherein the power-supply-side communication terminal comprises a first power-supply-side communication terminal electrically connected to the power supply unit and a second power-supply-side communication terminal electrically connected to the first interruption part, and wherein the first interruption part switches between whether or not to interrupt the current path according to an identification result of the identification unit without depending on control of a control unit, and the first interruption part switches between whether or not to interrupt the current path according to the voltage of the power-supply-side communication terminal and a voltage of the second power-supply-side communication terminal, and the electric tool comprises:

an input unit connected to the output unit of the power supply device;

a drive source driven by power supplied to the input unit;

a first tool side communication terminal connected to the first power-supply-side communication terminal of the power supply device; and a second tool side communication terminal connected to the second power-supply-side communication terminal of the power supply device, wherein the first tool side communication terminal and the second tool side communication terminal are electrically short-circuited to each other.

* * * * *